(12) United States Patent
Auzar et al.

(10) Patent No.: US 8,392,537 B2
(45) Date of Patent: *Mar. 5, 2013

(54) DEVICE CONFIGURATION AND DATA EXTRACTION USING A PORTABLE TRANSACTION FORMAT

(75) Inventors: Adzim Auzar, Fairport, NY (US); Robert Laveck, Rochester, NY (US); Nathan Mesh, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,100

(22) Filed: Apr. 5, 2012

(65) Prior Publication Data

US 2012/0191822 A1 Jul. 26, 2012

Related U.S. Application Data

(63) Continuation of application No. 11/363,603, filed on Feb. 28, 2006, now Pat. No. 8,195,805.

(51) Int. Cl.
*G06F 15/16* (2006.01)
(52) U.S. Cl. .......................... 709/219; 709/227; 709/230
(58) Field of Classification Search .................... 709/219
See application file for complete search history.

(56) References Cited

U.S. PATENT DOCUMENTS

| | | | |
|---|---|---|---|
| 6,272,341 B1 | 8/2001 | Threadgill et al. | |
| 6,940,870 B2 | 9/2005 | Hamlin | |
| 6,941,310 B2 | 9/2005 | Ahad et al. | |
| 7,197,569 B2 * | 3/2007 | Dowling | 709/230 |
| 7,228,355 B2 * | 6/2007 | Dowling | 709/230 |
| 7,293,110 B2 * | 11/2007 | Dowling | 709/249 |
| 7,490,172 B2 * | 2/2009 | Dowling | 709/249 |
| 7,509,437 B2 * | 3/2009 | Dowling | 709/249 |
| 7,571,227 B1 | 8/2009 | Pabla | |
| 7,581,030 B2 * | 8/2009 | Dowling | 709/249 |
| 7,631,105 B2 * | 12/2009 | Dowling | 709/249 |
| 7,937,498 B2 | 5/2011 | Dowling | |
| 2002/0176377 A1 | 11/2002 | Hamilton | |
| 2002/0176378 A1 * | 11/2002 | Hamilton et al. | 370/328 |
| 2003/0002521 A1 | 1/2003 | Traversat et al. | |
| 2003/0018755 A1 | 1/2003 | Masterson et al. | |
| 2003/0050070 A1 * | 3/2003 | Mashinsky et al. | 455/452 |
| 2003/0145067 A1 | 7/2003 | Cover et al. | |
| 2003/0215089 A1 * | 11/2003 | Mihaljevic et al. | 380/42 |
| 2003/0236933 A1 | 12/2003 | Shigeta et al. | |
| 2004/0015504 A1 * | 1/2004 | Ahad et al. | 707/100 |
| 2004/0093342 A1 * | 5/2004 | Arbo et al. | 707/102 |
| 2004/0249915 A1 | 12/2004 | Russell | |
| 2005/0038326 A1 | 2/2005 | Mathur | |
| 2005/0078824 A1 * | 4/2005 | Malinen et al. | 380/247 |
| 2005/0101309 A1 | 5/2005 | Croome | |
| 2005/0245249 A1 | 11/2005 | Wierman et al. | |
| 2006/0025076 A1 | 2/2006 | Yu | |
| 2006/0031237 A1 | 2/2006 | DeAnna et al. | |
| 2006/0159109 A1 | 7/2006 | Lamkin et al. | |
| 2006/0160543 A1 * | 7/2006 | Mashinsky | 455/452.2 |
| 2006/0161635 A1 | 7/2006 | Lamkin et al. | |

(Continued)

*Primary Examiner* — Tauqir Hussain
(74) *Attorney, Agent, or Firm* — Fox Rothschild, LLP; Robert J. Sacco

(57) ABSTRACT

Method for performing a data transaction (200) with a server (108) using a portable computer (106). The method includes receiving (402) in the portable computer a portable transaction file (104-1, 104-2, 104-3, 104-*n*) in a predetermined portable transaction file format (500) that includes two or more data fields. The data fields can contain a set of transaction parameters that define a type specific server protocol for a data transaction session with a particular server type (108-1, 108-2, 108-3, 108-*n*). By using a generic data transaction engine (302, 303) a data transaction session can be performed with any type of server for which a portable transaction file has been provided.

17 Claims, 10 Drawing Sheets

U.S. PATENT DOCUMENTS

| | | |
|---|---|---|
| 2006/0235945 A1 | 10/2006 | Frietas et al. |
| 2006/0277346 A1 * | 12/2006 | Doak et al. .................. 710/305 |
| 2007/0061488 A1 | 3/2007 | Alagappan et al. |
| 2007/0156821 A1 | 7/2007 | Hardy et al. |
| 2007/0198734 A1 | 8/2007 | Knowles et al. |
| 2009/0168701 A1 | 7/2009 | White et al. |

* cited by examiner

Session Information:

502

| Element | Content Type | Description |
|---|---|---|
| Version | Free Form Text | Version of the transaction session. |
| Author | Free Form Text | Author of the file. |
| Description | Free Form Text | Description of the transaction session. |
| CustomDescriptors | Name and Value Pairs | Custom text pairs that can be used to record domain specific information. |

Connection Properties:

504

| Element | Content Type | Description |
|---|---|---|
| TransportType | Text referencing supported Interpreter Transport | Connection medium to use (i.e. RS-232, PPP, Ethernet etc.) |
| PortNumber | Integer | Port to use on device, if applicable. |
| PortSpeed | Text referencing supported Transport Speed | Speed of the connection medium, if applicable. |
| CustomDescriptors | Name and Value Pairs | Custom text pairs that can be used to record domain specific information. |

Fig. 5B

Request List:

| Element | Content Type | Description |
|---|---|---|
| Request | See Below | Contains all request information including preconditions, timeout and transition path. |
| EnableLogging | True or False | Indicates whether interpreter will output all request responses classified as errors to a log file. |
| FinalRequestID | Integer corresponding to existing request ID | ID of request that links to no further requests and ends the transaction session. |

Request:

| Element | Content Type | Description |
|---|---|---|
| ID | Sequential Integer | Identifier for each request. |
| Timeout | Integer | Length of time in milliseconds to wait after issuing a request and not receiving a response before determining a connection failure has occurred. |
| Precondition | See Below | This element allows the execution of a request to depend on the response to a previous request's response. |
| CommandText | Free Form Text | Actual text of the command to send to the server. |
| TransitionPath | See Below | A list of at least one element that dictates the next request to execute based on the response received after this request is executed. |

Fig. 5C

Precondition:

| Element | Content Type | Description |
|---|---|---|
| RequestID | Integer corresponding to ID of previously executed request | Specifies request ID whose response will be used for comparison against the ResponseCondition element. |
| ResponseCondition | Regular Expression | Expression that will be compared by the interpreter to the response of the request denoted by RequestID. If the expression evaluates to equivalency, the request will be executed, otherwise the request denoted by the FailureRequestID will be executed. |
| FailureRequestID | Integer corresponding to existing request ID | ID of request that links to no further requests and ends the transaction session. |

TransitionPath:

| Element | Content Type | Description | 512 |
|---|---|---|---|
| NextRequestID | Integer corresponding to ID of existing request | Denotes request to execute next if the response received corresponds to the Response element. | |
| ResponseCondition | Regular Expression | Expression that the interpreter will compare the server's response to. | |
| Type | Text referencing the type of transition | 'Failure' if the transition path should be recorded as such in the log file, 'Success' otherwise. | | ns
DEVICE CONFIGURATION AND DATA EXTRACTION USING A PORTABLE TRANSACTION FORMAT

CROSS REFERENCE TO RELATED APPLICATIONS

This application is a continuation of and claims priority to non-provisional U.S. patent application Ser. No. 11/363,603, filed on Feb. 28, 2006, which is hereby incorporated by reference in its entirety.

BACKGROUND OF THE INVENTION

1. Statement of the Technical Field

The inventive arrangements relate generally to methods and systems for device configuration and data extraction, and more particularly to portable data processing devices for interacting with a device to be configured or from which data is to be extracted.

2. Description of the Related Art

In the electronics industry, there is a growing trend toward the development of equipment that is software configurable or that collects data that may later be extracted for analysis. These kinds of systems are increasingly popular in the fields of communications, data backup, data portability, and for cloning system configurations from one piece of equipment to another. The traditional method for performing these configuration and data extraction tasks typically involves bringing the equipment to a computer so the equipment can be configured. A communication link is typically established between the computer server and the client equipment to be configured or from which data is to be extracted. The communication link can be wired or wireless. A custom software application is usually provided for the computer for the purpose of executing the required configuration or data extraction process.

Still, in many instances, it is inconvenient or otherwise impractical to transport the client equipment requiring configuration or data extraction to a location where there is a computer that has the appropriate programming for performing the configuration or data extraction task. For example, the equipment may be mounted in a vehicle or in a remote location. In such instances, the computer can be transported to the site of the equipment so that the equipment can be configured or data extracted. Still, with the increasing prevalence of reconfigurable equipment and/or data collection equipment of this type, users are seeking more convenient methods for executing these tasks. For example, many users have found that it can be convenient to perform the configuration and/or data extraction task using a personal electronic device (PED). These PED devices are gaining popularity for these tasks because of their small size, wireless interfaces, and ability to communicate via the internet.

Despite the numerous advantages associated with using PEDs for the purpose of equipment configuration and data extraction, there are some problems associated with this approach. For example, software that is written for a conventional desktop or laptop computer is not directly suitable for use on certain PEDs. For example, this can be the case when the PED is a personal digital assistant (PDA). Hardware restrictions associated with the physical size of the PDAs can make a direct porting of the software somewhat difficult. This problem is normally addressed by writing custom computer code specifically designed for the PDA. The custom code typically duplicates some of the transaction code that is already written for a larger scale computer system. However, the software code for the PDA inevitably differs somewhat because the code is usually written in such a way that the coding is dependent on the nature of the data and based on domain specific information. Accordingly, the custom software approach tends to be cumbersome and cost intensive.

SUMMARY OF THE INVENTION

The invention concerns a method for performing a data transaction with a server using a portable computer. According to one aspect of the invention, the portable computer can be a personal electronic device (PED). The server can be any type of device that is configurable, or from which it can be desirable to extract data. For example, the server can be any type of configurable radio equipment, another computer, a PED, a security system, or a data collection device.

The method can begin by receiving in the portable computer one or more portable transaction files. Each portable transaction file can be provided in a predetermined portable transaction file format that includes a number of data fields. The data fields can contain transaction parameters. Collectively, the transaction parameters can form a transaction parameter set that defines a type specific server protocol for a data transaction session. The type specific server protocol can define a data transaction session for a particular server type.

Once the portable transaction file or files have been stored in a computer memory associated with the portable computer, the portable computer can perform a data transaction session. The portable computer can perform the data transaction session with any type of server for which the portable transaction file has been provided for defining the type specific server protocol, provided that the communication layer or transport type is available on the portable computer. In order to accomplish this result, the portable computer can advantageously include a generic data transaction engine. The generic data transaction engine can include a programmable microprocessor and a generic data transaction application software program. A transaction session executed by the generic data transaction engine can be universally configurable so that the transaction session can occur with any particular server type by using the information contained in the portable transaction file.

Viewed in a slightly different way, the method for performing a data transaction with the server can be described as follows. The method can begin by providing the portable computer with a data transaction engine comprising a generic data transaction software application. The generic data transaction software application can be dynamically configurable for performing a data transaction session with any server.

The method can further include providing the portable computer with one or more portable transaction files in a predetermined portable transaction file format. The portable transaction file format can include two or more data fields. Each of the data fields can be provided for specifying a transaction parameter of a transaction parameter set. The data field definitions are advantageously sufficient to accommodate a diverse set of data transaction parameters that are sufficient to define the transaction protocol for any data transaction between the portable computer and any server.

According to another aspect, the invention can also concern a portable computer for performing a data transaction with a server. The portable computer can include a data store containing one or more portable transaction files. The portable transaction files can each be arranged in a predetermined portable transaction file format. This format can include two or more data fields provided for containing two or more transaction parameters. The transaction parameters contained in each portable transaction file can collectively define a transaction parameter set as previously described.

The portable computer can also include a generic data transaction engine. The generic data transaction engine can be universally configurable responsive to the portable transaction file. More particularly, the portable transaction file can define the type specific server protocol for performing any data transaction session associated with any particular server type.

The portable computer can also include one or more data communication systems. The data communication system (or systems) can be chosen for establishing a data communication link between the portable computer and the server. Using the portable transaction file and the generic data transaction engine, the portable computer can perform the data transaction session. Notably, a data transaction session can be performed by the portable computer with any server for which the portable transaction file has been provided.

In general, the data transaction sessions referred to herein can include one or more activities. According to one aspect of the invention, the data transaction session can include communicating a set of configuration parameters from the portable computer to the server. For example, the configuration parameters can define a set of operating characteristics of the server. According to another aspect, the data transaction session can include communicating stored data from the server to the portable computer. According to yet another aspect, the data transaction session can include communicating stored data from the portable computer to the server.

The transaction parameter set described herein can include one or more parameters that are sufficient to specify the type specific server protocol. Advantageously, the data fields defined by the portable transaction file can be defined to include sufficient parameters to accommodate any server protocol. It can be desirable for the transaction parameters to specify (1) a set of connection properties required for communicating with the server, (2) a set of commands for controlling the server, (3) a sequence or ordering of requests, (4) a set of pre-conditions that should be satisfied before each request occurs (5) a set of queries for obtaining information from the server, and (6) a set of error scenario parameters.

BRIEF DESCRIPTION OF THE DRAWINGS

FIG. 5 is a diagram that is useful for understanding a format of a data transaction file.

DETAILED DESCRIPTION OF THE PREFERRED EMBODIMENTS

There are a growing number of electronic devices that are software reconfigurable for use in connection with a variety of different applications. There are also a growing number of devices from which data can be extracted. Such devices are generally referred to herein as server devices or simply servers. Further, the foregoing configuration and data extraction processes shall be generally referred to herein as data transactions or data transaction sessions. The invention concerns a method and apparatus for performing a data transaction with a server using a portable computer.

Referring now to FIGS. 1-5, there is shown an improved method and apparatus for data transactions. The invention is well suited for use in connection with portable computers, and more particularly for use with portable computers of the handheld variety. Such handheld computers are often referred to as personal electronic devices or PEDs.

Figure 1:
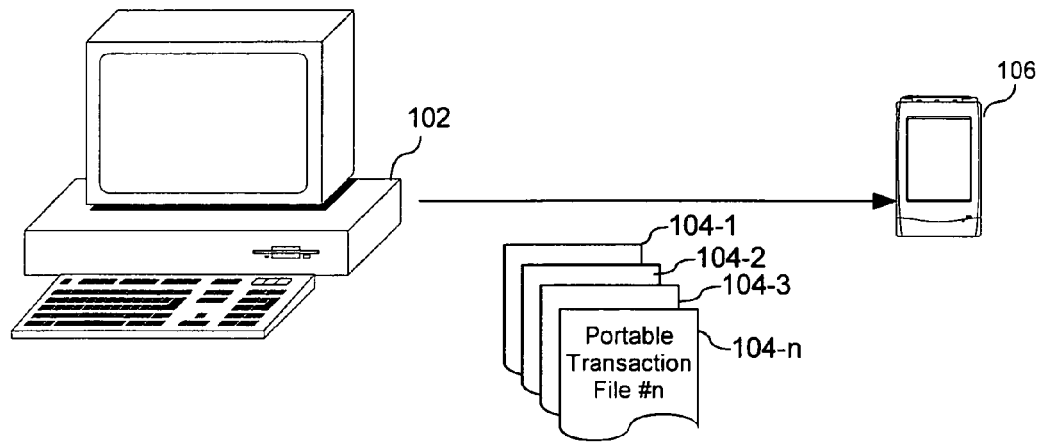
FIG. 1 is block diagram that is useful for understanding how one or more portable transaction files can be loaded into the memory of a portable computer.

Referring to FIG. 1, a portable computer 106 can be provided with one or more portable transaction files 104-1, 104-2, 104-3, 104-n. The portable transaction files can each be arranged in a predetermined portable transaction file format. This format can include two or more data fields provided for containing transaction parameters. The transaction parameters contained in a portable transaction file can collectively define a transaction parameter set.

The portable transaction files 104-1, 104-2, 104-3, 104-n can be provided to the portable computer 106 by any suitable means. In FIG. 1, the portable transaction files are shown being communicated directly to the portable computer 106 from computer 102. The portable transaction files 104-1, 104-2, 104-3, 104-n can be communicated to the portable computer 106 over any suitable data communication link. The communication link can be a wired or wireless communication link between the compute 102 and the portable computer 106. The communication link can also be formed using a computer network (not shown). In this regard it will be appreciated that many portable computers have the ability to access internet resources by wired or wireless means. Such internet communications can be used to deliver the portable transaction files 104-1, 104-2, 104-3, 104-n from the computer 102 to the portable computer 106. Those skilled in the art are well familiar with the various methods by which files can be loaded onto a portable computer 106 and all such methods are intended to be included within the scope of the present invention.

Figure 2:
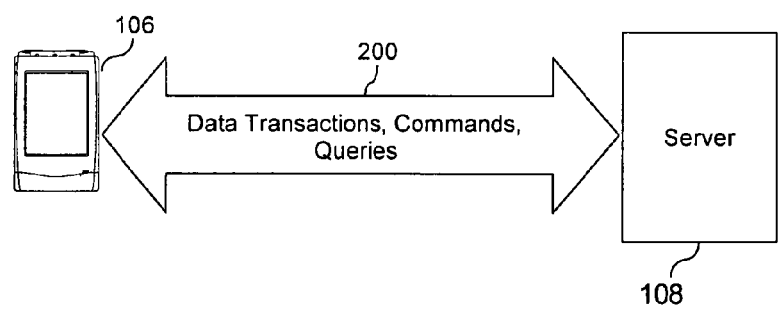
FIG. 2 is a block diagram that is useful for understanding how the portable computer in FIG. 1 can perform a data transaction session with a server.

According to an embodiment of the invention, the portable computer 106 can also include a generic data transaction engine. The generic data transaction engine is advantageously designed so as to be universally configurable for data transactions as described herein, with any type of server. Referring to FIG. 2, one of the portable transaction files 104-1, 104-2, 104-3, 104-n can define a type specific server protocol for performing a data transaction session 200 associated with a particular type of server 108.

Figure 3:
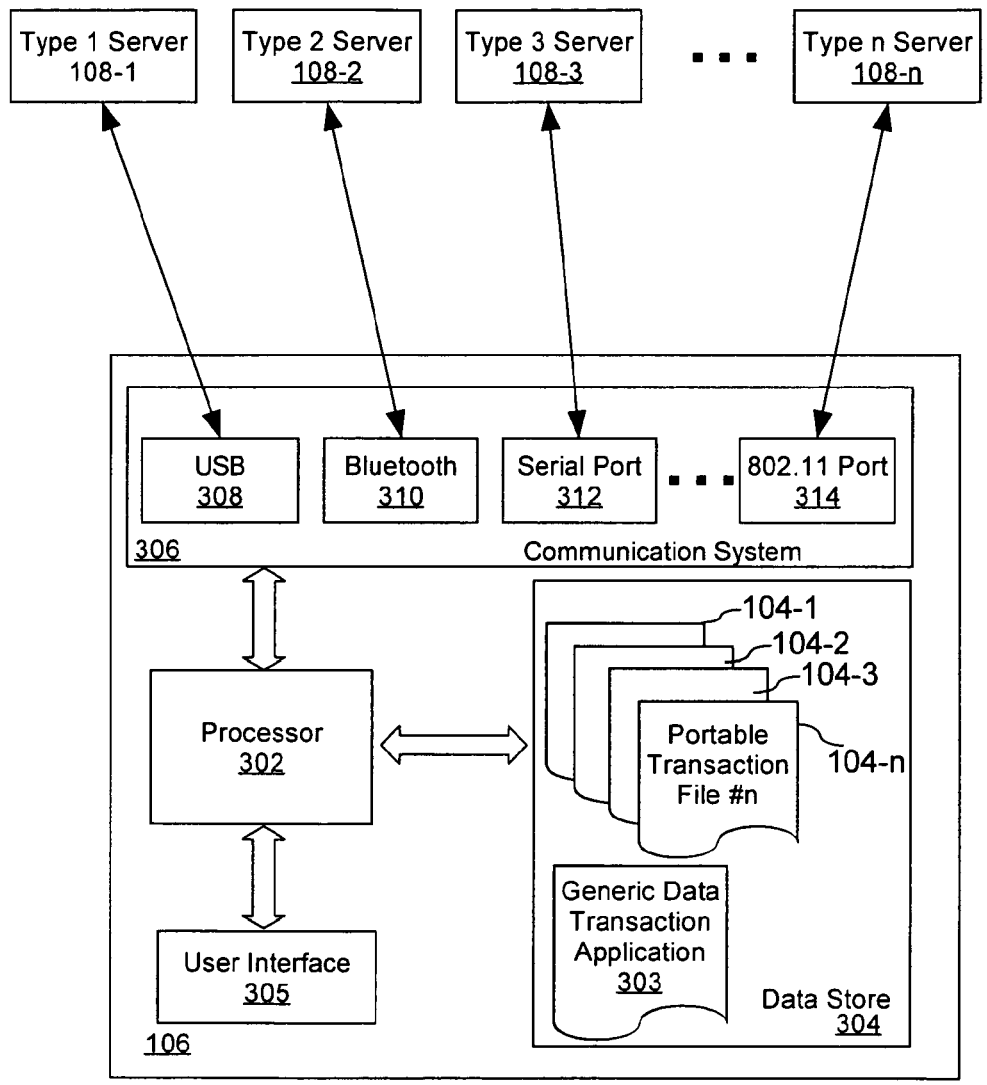
FIG. 3 is a more detailed block diagram showing how the portable computer in FIGS. 1 and 2 can perform a data transaction session with one or more different types of servers.

Referring now to FIG. 3, there is shown a more detailed block diagram that is useful for understanding the invention. As shown in FIG. 3, the portable computer 106 can include one or more components or subsystems that are arranged in a manner similar to that in conventional portable computer systems. For example, the portable computer 106 can include a processor 302, a user interface, a data store 304, and a communication system 306.

According to one aspect of the invention, the portable computer 106 can be a personal electronic device (PED). Personal electronic devices (PEDs) are well known in the art. For example PEDs are known to include mobile handheld computers, which are sometimes called personal digital assistants or PDAs. These devices have the ability to store, process and communicate data. PDAs generally fall into one of several categories which can include handheld PCs, palm size PCs, smart phones, and handheld instruments. PDAs typically include some kind of microprocessor with a commercially available operating system such as Linux, Palm OS, or Widows CE (Pocket PC). Many PDAs also have built in LCD displays, touch sensitive screens, and keypads for the human/machine interface. Some PDAs also include wireless networking capabilities. For example, many such devices can communicate with other devices using well known wireless networking. The foregoing capabilities make these compact devices highly useful for a various business and personal applications.

If portable computer 106 is a PED, then processor 302 can be any of a variety of commercially available microprocessor systems that are commonly used in PEDs. For example, microprocessor 302 can be selected from the StrongARM or XScale processors (e.g., SA-110 or PXA270) available from Intel Corp. of Santa Clara, Calif., the i.MX or Dragonball family of processors available from Freescale Semiconductor, Inc. of Austin, Tex., or the OMAP family of processors offered for sale by Texas Instruments of Dallas, Tex. Processor 302 can utilize any suitable commercially available operating system. Alternatively, in order to reduce energy consumption and costs, processor 302 can be implemented as a microelectronic controller.

Processor 302 can communicate respectively with data store 204. Data store 204 can be comprised of any suitable data storage system such as flash memory, read-only memory (ROM), EE PROM and/or dynamic random access memory (DRAM). The operating system for the processor can be stored in non-volatile memory in data store 304 or in another memory location (not shown). Still, those skilled in the art will appreciate that the invention is not limited with regard to the particular type of data store that is used for the operating system or application software of processor 302.

One or more portable transaction files 104-1, 104-2, 104-3, 104-n can be stored in data store 304. The data store can also be used for storing the generic data transaction application 303. Alternatively, one or more of data transaction files and the generic data transaction application can be stored in another data store.

Suitable data communication links can be provided between the processor 302, data store 304, user interface 305 and communication system 306. The data communication links can be any suitable type serial or parallel type data channels. For example, if the communication link is a parallel type data link then it can conform to any of a number of well known bus standards, including without limitation ISA, EISA, VESA, PCI, EMIF and so on. Alternatively, if a serial data channel is used, then it can be an I2C, SPI, Microwire, Maxim or other type serial data bus. Those skilled in the art will appreciate that the invention is not limited to any particular data link arrangement among the various components of the portable computer 106.

The data communication system 306 can be arranged for establishing a data communication link between the portable computer 106 and one or more servers 108-1, 108-2, 108-3, 108-n. For example, the communication system 306 can include communications subsystems capable of performing data communications in accordance with any of a variety of well known communications standards. Without limitation, these can include subsystem 308 that conforms to conventional universal serial bus (USB) standards, subsystem 310 that conforms to the Bluetooth wireless communication standard, subsystem 310 that conforms to a conventional serial bus standard, and subsystem 314 that conforms to the 802.11 family of wireless standards. Still, it should be understood that the invention is not limited to any particular type of communication port. Any wired, wireless and/or optical communication system can be provided. Further, it can be advantageous to provide a number of different types of communication subsystems to facilitated communications with a variety of different types of servers.

In FIG. 3, a data transaction session can be performed by the portable computer 106 with any server 108-1, 108-2, 108-3, 108-n for which a portable transaction file 104-1, 104-2, 104-3, 104-n has been provided. The server can be any type of device that is configurable, which can be loaded with certain data, or from which it can be desirable to extract data. For example, the server can be any type of configurable radio equipment, another computer, a PED, a security system, or a data collection device.

In general, the data transaction sessions referred to herein can include one or more activities without limitation. According to one aspect of the invention, the data transaction session can include communicating a set of configuration parameters from the portable computer 106 to any one of the servers 108-1, 108-2, 108-3, 108-n for which a portable transaction file has been provided. For example, the configuration parameters can define a set of operating characteristics of the server. According to another aspect, the data transaction session can also include communicating stored data from the server 108-1, 108-2, 108-3, 108-n to the portable computer 106. According to yet another aspect, the data transaction session can include communicating stored data from the portable computer 106 to the server 108-1, 108-2, 108-3, 108-n.

The portable transaction file or files 104-1, 104-2, 104-3, 104-n can each be arranged in a predetermined portable transaction file format. This format can include two or more data fields provided for containing transaction parameters. The transaction parameters contained in a portable transaction file can collectively define a transaction parameter set. The transaction parameter set can include one or more parameters that are sufficient to specify the type specific server protocol. Advantageously, the data fields defined by the portable transaction file can be defined to include sufficient parameters to accommodate a protocol for any type of server 108-1, 108-2, 108-3, 108-n.

Figure 4:
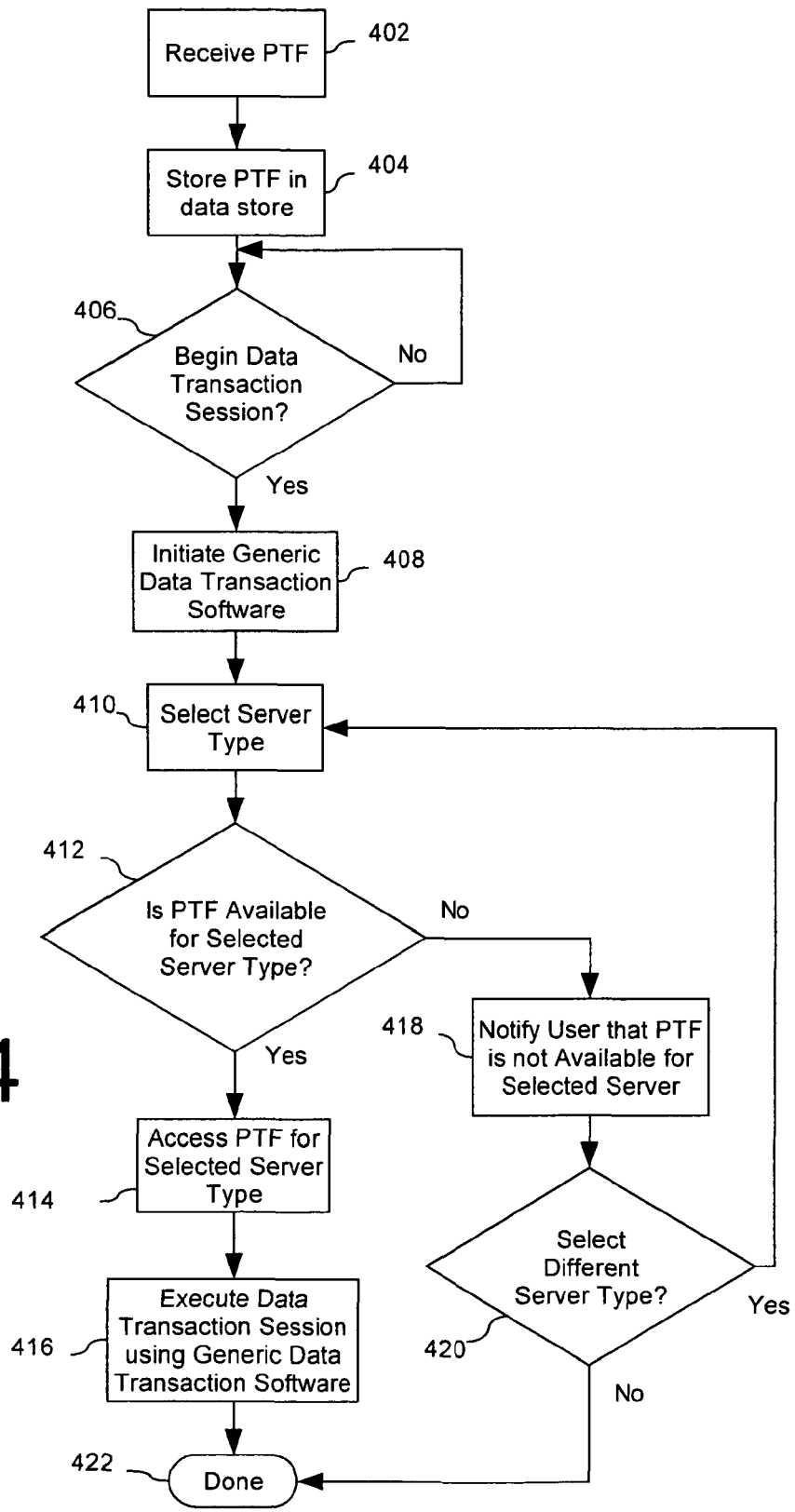
FIG. 4 is a flowchart that is useful for understanding a method for performing a data transaction with a server using a portable computer.

Referring now to FIG. 4, there is shown a flowchart that is useful for understanding an improved method for conducting data transaction sessions. The process can begin in step 402 when the portable transaction file (PTF) is provided to the portable computer 106. Once received, the portable transaction file can be stored in data store 304 until needed. In step 406, the process can continue by checking to determine if a request has been received to begin a data transaction session. Such a request can be initiated by a user by means of user interface 305 or any other suitable method.

If no request is received, the process can loop back to step 406 and wait for further instructions. However, if a request for a data transaction is received, then the process can continue on to step 408. In step 408, the generic data transaction application 303 can be initiated if the application software is not already running. Thereafter, in step 410, the user can be prompted to identify the type of server 108-1, 108-2, 108-3, 108-n for which a data transaction session is to be performed. Based on this information, a determination can be made in step 412 as to whether a portable transaction file 104-1, 104-2, 104-3, 104-n is available for the type of server that has been identified. If not, the user can be notified in step 418 that the portable computer does not have the required portable transaction file for the selected server type. The user can then be offered the opportunity in step 420 to select a different server type in step 410 or the process can terminate in step 422.

If a portable transaction file is available for the selected server type, then in step 314, that file can be retrieved from data store 304 and loaded into working memory for the processor 302. For example, if the user identifies the server as type 3 server 108-3, then portable transaction file 104-3 can be selected from data store 304 and loaded into memory. Thereafter, in step 416 the data transaction session can be executed by utilizing the generic data transaction application 303 and the appropriate portable transaction file for the selected server. Upon completion of the data transaction session, the process can end in step 422.

In order to allow a single generic data transaction program 303 to perform a data transaction session 200 with any type of server 108-1, 108-2, 108-3, 108-n, the format for the portable transaction file must accommodate a set of parameters that are sufficient to completely define the data transaction protocol for a particular server type. In general, this means that four basic types of information must be provided for the generic data transaction program. It can be desirable for the transaction parameter set to specify (1) a set of connection properties required for communicating with the server, (2) a set of commands for controlling the server, (3) a sequence or ordering of requests, (4) a set of pre-conditions that should be satisfied before each request occurs (5) a set of queries for obtaining information from the server, and (6) a set of error scenario parameters. The format of the portable transaction file should be generalized to include a wide range of transaction protocols, but also should allow for a sufficient level of detail to properly implement the data transaction. Similarly, the generic data transaction application should have sufficient flexibility to implement any such data transaction protocol.

Figure 6:
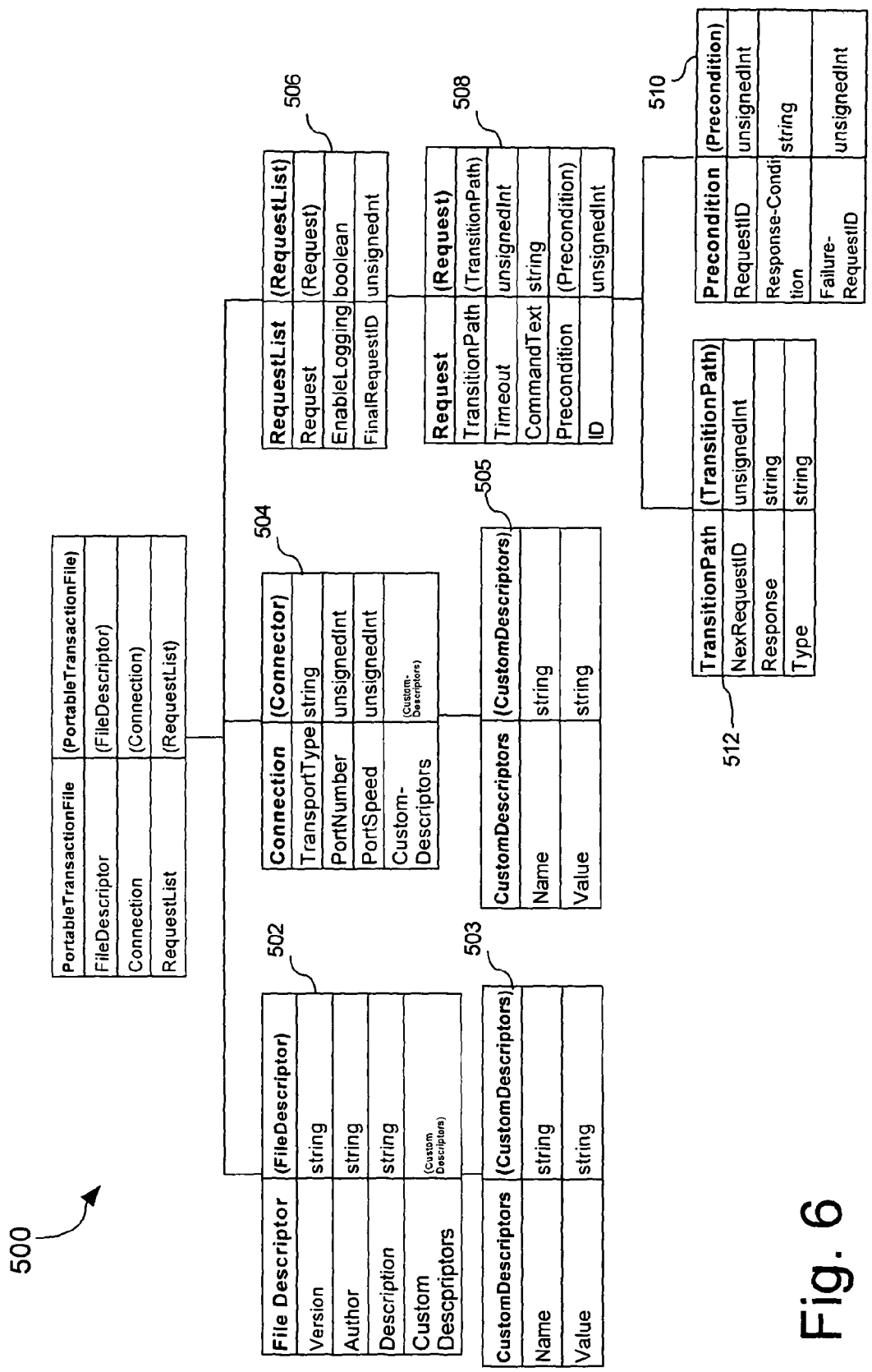
FIG. 6 is a drawing that is useful for understanding a hierarchical relationship among a plurality of parameters in the data transaction file of FIG. 5.

In FIG. 5, there is shown one example of a format for a portable transaction file 108-1, 108-2, 108-3, 108-n. It should be understood that the example shown in FIG. 5 is not intended to limit the invention. Instead, the format shown is merely provided to illustrate one possible way in which the set of transaction parameters could be presented. Referring to FIG. 6, it can be observed that the portable transaction file format of FIG. 5 can be arranged in a hierarchical form. According to one embodiment, the portable transaction file can be provided in the form of an XML (Extensible Markup Language) document. XML is a well known standard that facilitates the encoding of information and services with meaningful data structures. XML is commonly used for information exchange and can conveniently accommodate user-specified tags. Still, the invention is not limited in this regard, and other representations of the portable transaction file can also be used within the scope and meaning of the present invention.

Referring now to FIGS. 5 and 6, it will be appreciated that each portable transaction can generally include (1) Session Information 502, (2) Connection Properties 504, and (3) Request List 506. The Session Information 502 can include several parameters including the Version, Author name, a Description of the transaction session, and one or more Custom Descriptors 503 that can be used to record domain specific information. These parameters can be represented as text strings or in any other convenient manner.

The Connection Properties 504 can include several parameters, such as the TransportType, PortNumber, and the PortSpeed. The TransportType parameter can represent the connection medium to be used (e.g. RS-232, PPP, Ethernet and so on). Typically the TransportType and the PortSpeed can be represented as simple text strings. The PortNumber can be represented as an unsigned integer. One or more Custom Descriptors 505 can be provided for recording domain specific information.

The Request List 506 can include one or more different types of Requests 508 that may be necessary as part of a transaction session. For example, these Requests can include, without limitation, a request to transmit certain data, to accept certain data that is being transmitted, or to configure the server for the data transaction session. Information about each Request 508 in the Request List 506 can be provided. For example, such information can include command text, information including preconditions, timeout and transition path as described in more detail below.

The Request List 506 can also include an EnableLogging parameter. The EnableLogging parameter can be a simple Boolean operator that can be used to determine whether logging should be performed in connection with a particular request. The request list 506 can also include a FinalRequestID parameter that identifies the particular request in the Request List that links to no further requests and ends a particular transaction session.

For each Request 508, a transition path can be specified to identify (1) a sequential identifier ID number assigned to the Request, (2) a Timeout value that specifies the length of time in milliseconds to wait after issuing a request and not receiving a response before determining a connection failure has occurred, (3) a set of Preconditions upon which the execution of the request may depend, (4) a CommandText parameter that specifies the actual text of the command to send to the server, and (4) a TransactionPath parameter that dictates the next request to execute based on the response received after the current request is executed. Precondition and TransitionPath parameters are described in more detail below.

The set of Preconditions 510 can include one or more parameters including a RequestID parameter that specifies a request identification number, which number can be used for comparison against a ResponseCondition parameter. The ResponseCondition parameter can be a text string or other expression that can be compared by the generic transaction engine to the response of the Request denoted by the RequestID. If the expression evaluates to equivalency, then the Request can be executed. Otherwise, the request denoted by the FailureRequestID will be executed. The FailureRequestID can be an integer ID that links to no further requests and ends a transaction session.

The TransitionPath 512 can include several parameters, including a NexRequestID, a ResponseCondition, and a Type. The ResponseCondition parameter can be a regular expression that the generic transaction engine will compare to a response received from a server. The NexRequestID parameter can be used to specify the next request to be executed if a response received from a server corresponds to the Response parameter. Finally, the Type parameter can specify a type of transition. This parameter can also be expressed as a text string. The text can specify whether the transition path should be recorded in the log file as a "failure" or "success".

Figure 7A:
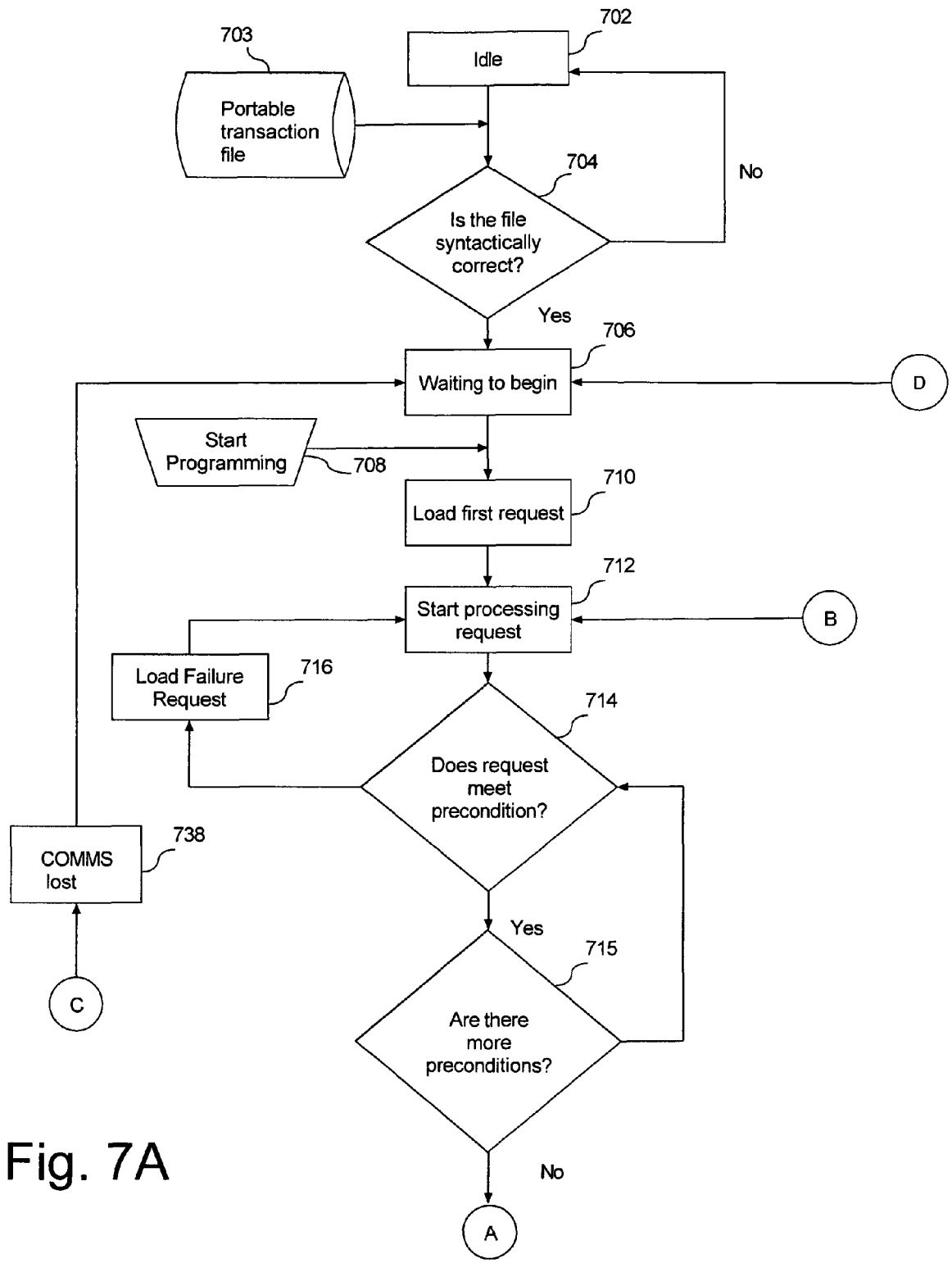
FIG. 7 is a flowchart that is useful for understanding a process flow in a generic data transaction engine.
Figure 7B:
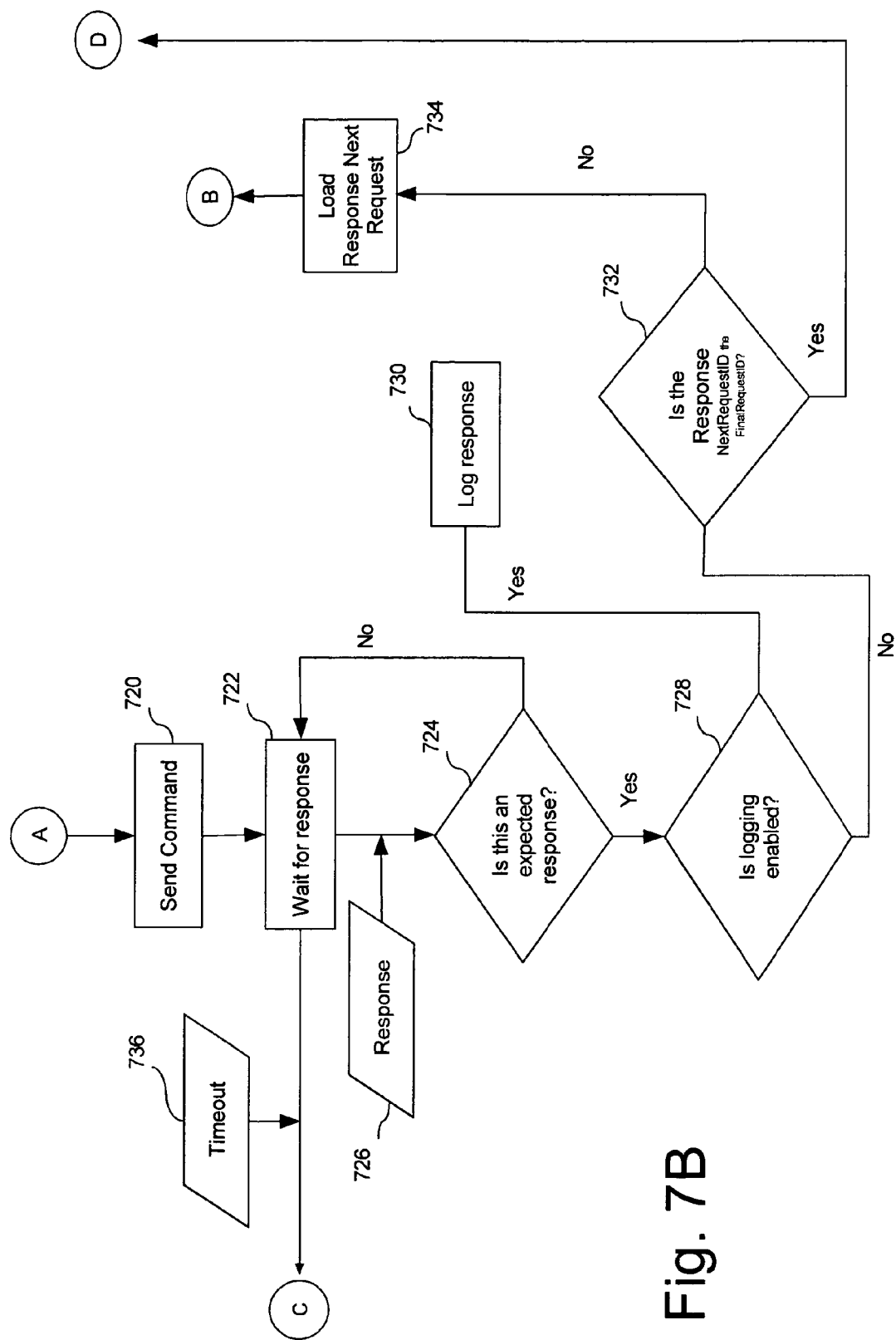

The information contained in the portable transaction file in FIGS. 5 and 6 can be used by the generic data transaction application software 303. Specifically, the information can be used to perform a data transaction session as per step 416 in FIG. 4. The transaction session can be performed with one or more servers 108-1, 108-2, 108-3, 108-n. FIG. 7 is a drawing that is useful for understanding in greater detail a process flow of a generic data transaction application 303.

Referring now to FIG. 7, it can be observed that the generic data transaction application can remain in an idle state in step 702 until it is provided with a portable transaction file in step 703. In step 704, the generic data transaction application 303 can determine if the file is syntactically correct. If not, the generic data transaction application can return to its idle state and can optionally generate a suitable user notification.

If the portable transaction file is syntactically correct, then the process can continue to step 706. In step 706, the application can wait for a control input indicating that a transaction session is to be initiated. If a "start programming" control input 708 is received, then the transaction session can continue. If not, the system remains in the idle process 706. In step 710, a first Request 508 can be loaded from the portable transaction file 500. In step 712, processing of the first Request 508 can begin. In steps 714 and 718, the generic data transaction application 303 can determine if each Precondition parameter 510 that is associated with a particular Request 508 has been satisfied. If a particular precondition is not satisfied, the system can load the FailureRequestID number in step 716. The FailureRequestID can specify an alternative Request 508 to be used if the preconditions are not satisfied.

If all preconditions have been satisfied, then the CommandText associated with the particular request 508 can be transmitted to the server 108 in step 720. In step 722, the generic data transaction application 303 can wait for a response from the server 108. The extent of the wait period will be determined by the Timeout parameter included in the Request 508. If a timeout occurs in step 736, then the system will proceed to step 738 and notify a user that communication with the server 108 has been lost. Alternatively, if a response 726 is received, then the system will continue on to step 724.

In step 724, a determination will be made as to whether a response is an expected response. Using the information in the TransitionPath 512, the response received from the server can be compared to a Response string specified by the portable transaction file 500. If the received response is not the expected response, the application can return to the waiting condition in step 722. Alternatively, if the response received from the server properly matches the specified Response string from TransitionPath 512, then the application can continue on to step 728. In step 728, the generic data transaction application 303 will determine whether logging is enabled. This determination can require an evaluation of the EnableLogging parameter in the RequestList 506. If logging is enabled, then the response will be logged in step 730 before moving on to step 732. Otherwise, the system can transition directly to step 732.

In step 732, the NextRequestID number from the TransitionPath 512 can be compared to the FinalRequestID number from the RequestList 506. If the NextRequestID is equal to the FinalRequestID, then this can be an indication that the data transaction is complete. Accordingly, the system can return to its waiting state in step 706. If the NextRequestID is not equal to the FinalRequestID, then the next Request 508 can be loaded from the RequestList 506. The system can then return to step 712 and continue processing the next Request.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A method for performing a data transaction with a server using a portable computer, comprising:

prior to establishing a data communications link between a portable computer and a first server of a selected server type, receiving in said portable computer from a computer remote from said first server one or more portable transaction files in a predetermined portable transaction file format that includes a plurality of data fields, each of said portable transaction files specifying in one or more of said data fields a plurality of transaction parameters comprising a transaction parameter set that defines a type specific server protocol that is to be used during a data transaction session between said portable computer and a second server of one of a plurality of different server types;

establishing said data communications link between said portable computer and said first server;

executing on said portable computer a generic data transaction engine software application;

using said transaction parameter set of a respective portable transaction file of said portable transactions files to configure said generic data transaction engine software application such that session communications between said portable computer and said first server can be performed in accordance with said type specific server protocol, said respective portable transaction file being provided for said selected server type; and performing said data transaction session with any server if one of said portable transaction files has been provided for said selected server type by using said generic data transaction engine software application;

wherein said generic data transaction engine software application is universally configured to facilitating data transaction session communications between said portable computer and servers of said plurality of different particular server types using a plurality of type specific server protocols, said generic data transaction engine software application being universally configurable based on said portable transaction files.

2. The method according to claim 1, further comprising selecting said data transaction session to include communicating a set of configuration parameters from said portable computer, said configuration parameters defining a set of operating characteristics of said one of said plurality of different particular server types.

3. The method according to claim 1, further comprising selecting said data transaction session to include communicating stored data from said second server of said one of said plurality of different particular server types to said portable computer.

4. The method according to claim 1, further comprising selecting said data transaction session to include communicating stored data from said portable computer to said second server of said one of said plurality of particular server types.

5. The method according to claim 1, further comprising selecting said first server from the group consisting of a configurable radio, a PED, a security system, and a data collection device.

6. A method for performing a data transaction with a server using a portable computer, comprising:

prior to establishing a data communications link between a portable computer and a first server of a selected server type, providing said portable computer with a generic data transaction engine comprising a generic data transaction software application dynamically configured to perform a data transaction session between said portable computer and servers of a plurality of different server types using a plurality of type specific server protocols;

providing said portable computer with one or more portable transaction files from another computer remote from said first server in a predetermined portable transaction file format that includes a plurality of data fields, said plurality of data fields in each of said portable transaction files provided for specifying a transaction parameter of a transaction parameter set that defines a type specific server protocol that is to be used during a data transaction session of said data transaction session between said portable computer and one of said servers; and responsive to establishing a data communication link between said portable computer and said first server, performing said data transaction session between said portable computer and said first server by using said generic data transaction engine, if one of said portable transaction files is associated with said selected server type.

7. The method according to claim 6, further comprising selecting said data transaction session to include communicating a set of configuration parameters from said portable computer to said first server in accordance with said set of data transaction parameters, said configuration parameters defining a set of operating characteristics of said selected server type.

8. The method according to claim 6, further comprising selecting said data transaction session to include communicating stored data from said first server to said portable computer in accordance with said set of data transaction parameters.

9. The method according to claim 6, further comprising selecting said data transaction session to include communicating stored data from said portable computer to said first server in accordance with said set of data transaction parameters.

10. The method according to claim 6, further comprising selecting said first server from the group consisting of a configurable radio, a PED, a security system, and a data collection device.

11. The method according to claim 6, further comprising providing said portable computer with a plurality of said portable transaction files that define a plurality of protocols for data transaction sessions between said portable computer and a plurality of different types of servers.

12. The method according to claim 6, further comprising selecting said portable computer to be a PED.

13. A portable computer for performing a data transaction with a server, comprising:

a data store in said portable computer containing one or more portable transaction files in a predetermined portable transaction file format that includes a plurality of data fields, each of said portable transaction files specifying in one or more of said data fields a plurality of transaction parameters comprising a transaction parameter set that defines a type specific server protocol that is to be used during a data transaction session between said portable computer and one of a plurality of different particular server types;

at least one transceiver element to establishing a data communications link between said portable computer and a server of a selected server type and for receiving said portable transaction files from another computer remote from said server; and a processing element executing a software application comprising a generic data transaction engine software application that is universally configured to facilitating data transaction session communications between said portable computer and servers of said plurality of different particular server types using a plurality of type specific server protocols, said generic data transaction engine software application being universally configurable based on said portable transaction files, wherein responsive to said establishing said data communications link, said processing element performs said data transaction session with said server if one of said portable transaction files has not been provided for said selected server type.

14. The portable computer according to claim 13, wherein said data transaction session includes communicating a set of configuration parameters from said portable computer to said server, said configuration parameters defining a set of operating characteristics of said server.

15. The portable computer according to claim 13, wherein said data transaction session includes communicating stored data from said server to said portable computer.

16. The portable computer according to claim 13, wherein said data transaction session includes communicating stored data from said portable computer to said server.

17. The portable computer according to claim 13 wherein said server is a device selected from the group consisting of a configurable radio, a PED, a security system, and a data collection device.

* * * * *